US012530622B2

(12) United States Patent
Hussain

(10) Patent No.: US 12,530,622 B2
(45) Date of Patent: Jan. 20, 2026

(54) GENERATING NEW DATA BASED ON CLASS-SPECIFIC UNCERTAINTY INFORMATION USING MACHINE LEARNING

(71) Applicant: BitsBody, LLC, Fresno, CA (US)

(72) Inventor: Mozammil Hussain, Fresno, CA (US)

(73) Assignee: BitsBody, LLC, Fresno, CA (US)

( * ) Notice: Subject to any disclaimer, the term of this patent is extended or adjusted under 35 U.S.C. 154(b) by 582 days.

(21) Appl. No.: 18/072,677

(22) Filed: Nov. 30, 2022

(65) Prior Publication Data

US 2024/0054394 A1 Feb. 15, 2024

Related U.S. Application Data

(60) Provisional application No. 63/396,891, filed on Aug. 10, 2022.

(51) Int. Cl.
*G06N 7/01* (2023.01)
*G06N 20/00* (2019.01)

(52) U.S. Cl.
CPC ............... *G06N 20/00* (2019.01); *G06N 7/01* (2023.01)

(58) Field of Classification Search
CPC .................................. G06N 20/00; G06N 7/01
See application file for complete search history.

(56) References Cited

PUBLICATIONS

Izmailov, P., et al, Semi-Supervised Learning with Normalizing Flows, Retrieved from Internet:<https://proceedings.mlr.press/v119/izmailov20a> (Year: 2020).*
Bellagente, M., et al, Understanding Event-Generation Networks via Uncertainties, Retrieved from Internet:<https://www.scipost.org/10.21468/SciPostPhys.13.1.003?acad_field_slug=politicalscience> (Year: 2021).*
Denker, A., et al, Conditional Invertible Neural Networks for Medical Imaging, Retrieved from Internet:<https://www.mdpi.com/2313-433X/7/11/243> (Year: 2021).*

(Continued)

*Primary Examiner* — Miranda M Huang
*Assistant Examiner* — Bart I Rylander
(74) *Attorney, Agent, or Firm* — Duane Morris LLP

(57) ABSTRACT

A system and related methods for generating class-specific data are disclosed. The data belong to an input space with an unknown initial probability distribution and a known classification scheme. From a relatively small, unbalanced dataset of samples with respect to the classification scheme in the input space, the system is programmed to learn a series of invertible transformations from the input space to a target space, a target probability distribution for the samples in the target space, and a trainable parameter probability distribution for each parameter of the target probability distribution to represent uncertainty information related to the target probability distribution. The system is programmed to further identify how to sample from each parameter probability distribution, which determine how to sample from the target probability distribution, to generate samples in the input space that are more likely to belong to specific classes.

19 Claims, 9 Drawing Sheets

(56) References Cited

PUBLICATIONS

Perarnau, G., et al, Invertible Conditional GANs for image editing, Retrieved from Internet:<https://arxiv.org/abs/1611.06355> (Year: 2016).*

International Search Report and Written Opinion for Application No. PCT/U.S. Pat. No. 2023071959, mailed Dec. 4, 2023, 15 pages.

Pavel Izmailov et al: "Semi-Supervised Learning with Normalizing Flows", arxiv.org, Cornell University Library, 201 Olin Library Cornell University Ithaca, NY 14853, Dec. 30, 2019 (Dec. 30, 2019), 8 pages.

Marco Bellagente et al: "Understanding Event-Generation Networks via Uncertainties", arxiv.org, Cornell University Library, 201 Olin Library Cornell University Ithaca, NY 14853, Apr. 9, 2021 (Apr. 9, 2021), 13 pages.

Bingham, et al., "Discovering parametric activation functions," arXiv preprint. 2020: 2006.03179; pp. 1-34. https://arxiv.org/abs/2006.03179.

Kim, "Statistical notes for clinical researchers: assessing normal distribution (2) using skewness and kurtosis," Restorative Dentistry & Endodontics. 2013: vol. 38(1); pp. 52-54. https://synapse.koreamed.org/articles/1090037.

Amidan, et al., "Data outlier detection using the Chebyshev theorem," IEEE Aerospace Conference. 2005: pp. 3814-3819.

Ardizzone, et al., "Guided image generation with conditional invertible neural networks," arXiv preprint. 2019, 1907.02392; pp. 1-11.

Bingham, et al., "Discovering parametric activation functions," arXiv preprint. 2020: 2006.03179; pp. 1-34.

Chan, et al., "Chebyshev pooling: An alternative layer for the pooling of CNNs-based classifier," IEEE 4th International Conference on Computer and Communication Engineering Technology (CCET). 2021: pp. 106-110.

Chhabra, et al., "Comparative analysis of methods to denoise CT scan images," International Journal of Advanced Research in Electrical, Electronics and Instrumentation Engineering. 2013; vol. 7(3): pp. 3363-3369.

Dillon, et al., "Tensorflow distributions," arXiv preprint. 2017: 1711.10604; pp. 1-13.

Gelman, "A Bayesian formulation of exploratory data analysis and goodness-of-fit testing," International Statistical Review. 2003: vol. 72(2); pp. 369-382.

Huang, et al., "Densely connected convolutional networks," Proceedings of the IEEE Conference on Computer Vision and Pattern Recognition. 2017: pp. 4700-4708.

Huang, et al., "Normalization techniques in training dnns: Methodology, analysis and application," arXiv preprint. 2020 :2009.12836; pp. 1-20.

Jones, et al., "The sinh-arcsinh normal distribution," Significance Magazine for the Royal Statistical Society. 2019: pp. 6-7.

Kaur, et al., "FP-MMR: A framework for the preprocessing of multimodal MR images," International Conference on Information and Communication Technology for Intelligent Systems. 2020; vol. 1: pp. 363-375.

Kesemen, et al., "Determination of the confidence intervals for multimodal probability density functions" Gazi University Journal of Science. 2018: vol. 31(1); pp. 310-326.

Kim, "Statistical notes for clinical researchers: assessing normal distribution (2) using skewness and kurtosis," Restorative Dentistry & Endodontics. 2013: vol. 38(1); pp. 52-54.

Kingma, et al. "Glow: Generative flow with invertible 1×1 convolutions" Conference on Neural Information Processing Systems. 2018; vol. 31: pp. 10215-10224.

Koehler, et al., "Representational aspects of depth and conditioning in normalizing flows," International Conference on Machine Learning. 2021; vol. 139: pp. 5628-5636.

Kronheim, et al., "TensorBNN: Bayesian inference for neural networks using TensorFlow," arXiv preprint. 2020: 2009.14393; pp. 1-25.

Lee, et al. "Geometric Interpretation on Chebyshev Type Inequalities," Communications for Statistical Applications and Methods. 1999: vol. 6(1); pp. 261-266.

Li, et al., "Involution: Inverting the inherence of convolution for visual recognition," Proceedings of the IEEE/CVF Conference on Computer Vision and Pattern Recognition. 2021: pp. 12321-12330.

Lu, et al., "Structured output learning with conditional generative flows," Proceedings of the AAAI Conference on Artificial Intelligence. 2020; vol. 34(4): pp. 5005-5012.

Masoudi, et al. "Quick guide on radiology image pre-processing for deep learning applications in prostate cancer research," Journal of Medical Imaging. 2021; vol. 8(1): article 010901: pp. 1-14.

Moreno-Barea, et al., "Improving classification accuracy using data augmentation on small data sets," Expert Systems with Applications. 2020; vol. 161: article 113696: pp. 1-14.

Muschelli, "Recommendations for Processing Head CT Data," Frontiers in Neuroinformatics. 2019; vol. 13: article 61: pp. 1-9.

Newell, et al., "Forgotten moments: A note on skewness and kurtosis as influential factors in inferences extrapolated from response distributions," Journal of Motor Behavior. 1984: vol. 16(3); pp. 320-335.

Perona, et al., "Scale-space and edge detection using anisotropic diffusion," IEEE Transactions on Pattern Analysis and Machine Intelligence. 1990; vol. 12(7): pp. 629-639.

Rezende, et al., "Variational inference with normalizing flows," International Conference on Machine Learning. 2015: pp. 1530-1538.

Vabalas, et al., "Machine learning algorithm validation with a limited sample size," PLoS One. 2019; vol. 14(11): article e0224365: pp. 1-20.

Vehtari, et al., "Bayesian model assessment and comparison using cross-validation predictive densities," Neural Computation. 2002: vol. 14(10); pp. 2439-2468.

* cited by examiner

FIG. 6

602 Obtain a first machine learning model that learns and generates a plurality of invertible mappings from an input space of feature vectors to a latent space of feature vectors and a plurality of posterior probability distributions for trainable parameters of the plurality of invertible mappings 604 Determine, from the first machine learning model, a new probability distribution for feature vectors in the latent space and a plurality of posterior probability distributions for the trainable parameters of the new probability distribution 606 Obtain a second machine learning model that classifies a feature vector in the input space into a class of a plurality of classes of the given classification scheme 608 Identify, using second machine learning model, a combination of respective intervals of the plurality of posterior probability distributions that lead to a feature vector in the input space with a probability of belonging to a specific class of the plurality of classes that exceed a threshold 610 Sample from the new probability distribution using values of the trainable parameters of the new probability distribution sampled from the combination of respective intervals to generate a specific set of latent feature vectors in the latent space 612 Convert the specific set of latent feature vectors to the input space using the plurality of invertible mappings in a reverse direction, thereby generating a specific set of input feature vectors as synthetic images for the specific class

GENERATING NEW DATA BASED ON CLASS-SPECIFIC UNCERTAINTY INFORMATION USING MACHINE LEARNING

RELATED APPLICATION

This application claims priority under 35 U.S.C. 119(e) to Provisional Application No. 63/396,891 entitled "GENERATING NEW DATA BASED ON CLASS-SPECIFIC UNCERTAINTY INFORMATION USING MACHINE LEARNING" and filed on Aug. 10, 2022, the contents of which are herein incorporated in their entirety by reference for all purposes.

TECHNICAL FIELD

The present application relates to machine learning and digital image processing and generation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning models generally require a large amount of training data. However, raw data can be scarce and imbalanced in various fields, such as the medical field. Consequently, sampling bias arises from under-representation or over-representation of certain classes. It would be helpful to have an efficient approach of generating new datasets specific to such certain classes.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 6 illustrates an example process of generating class-specific synthetic image data from raw data using uncertainty information of trainable parameters.

DESCRIPTION OF THE EXAMPLE EMBODIMENTS

Figure 1:
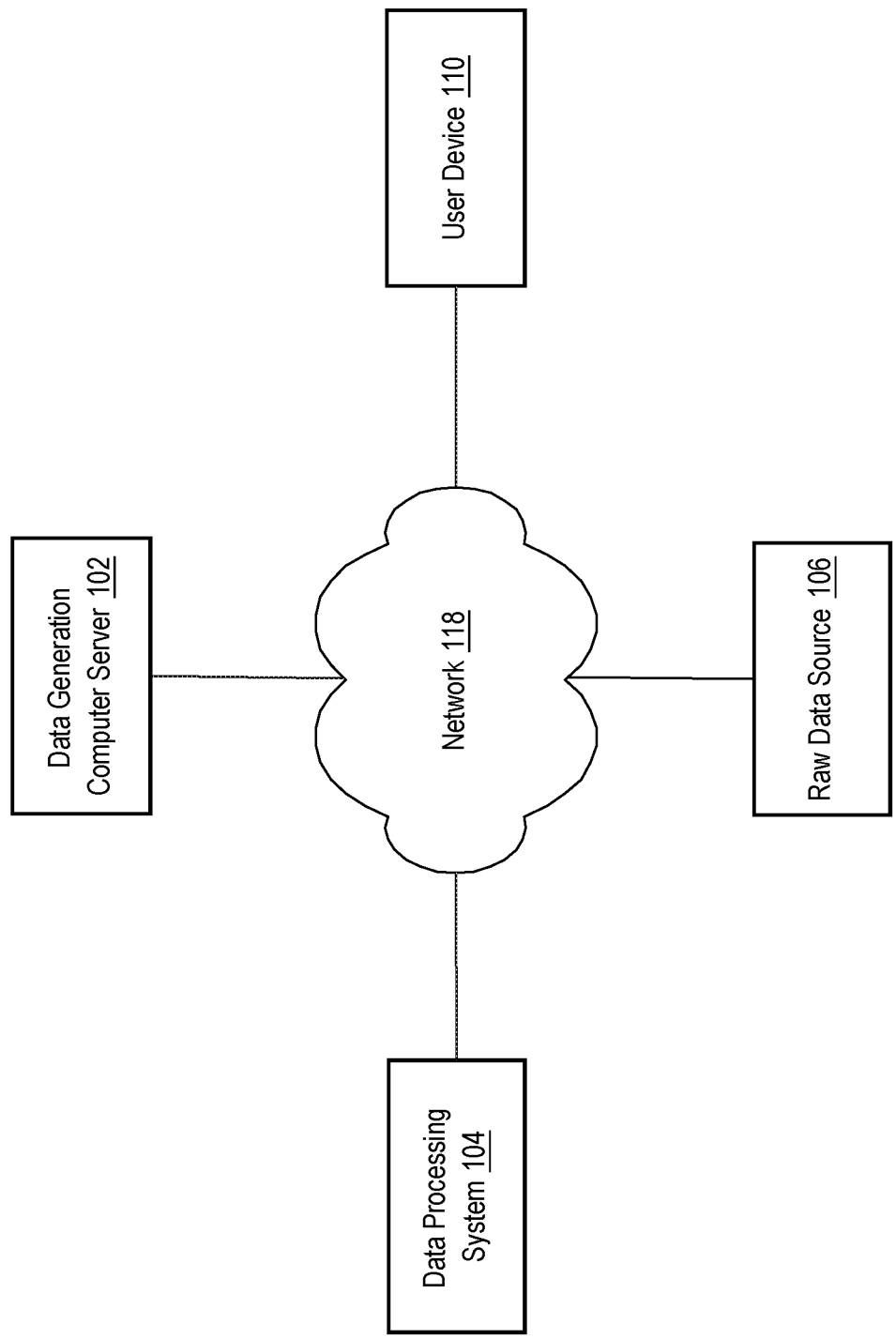
FIG. 1 illustrates an example networked computer system in which various embodiments may be practiced.

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

Embodiments are described in sections below according to the following outline:

1. GENERAL OVERVIEW
2. EXAMPLE COMPUTING ENVIRONMENTS
3. EXAMPLE COMPUTER COMPONENTS
4. FUNCTIONAL DESCRIPTIONS
   4.1. COMPLETE WORKFLOW OF IMAGE PROCESSING AND GENERATION
   4.2. DATA PREPARATION FOR PROBABILISTIC GENERATIVE MODELS
   4.3. ARCHITECTURE OF PROBABILISTIC GENERATIVE MODELS
      4.3.1. WINSORIZATION AND NORMALIZATION (WINNORM) LAYER
      4.3.2. PROBABILISTIC NEURAL NETWORK
      4.3.3. FULL COUPLING LAYER
   4.4. TRAINING AND EVALUATION OF PROBABILISTIC GENERATIVE MODELS
   4.5. POSTERIOR PREDICTION OF PROBALISTIC GENERATIVE MODELS
   4.6. MAPPING UNCERTAINTY INFORMATION TO CLASS LABELS IN GENERATED DATA
      4.6.1. TRAINING AND EVALUATION OF CLASSIFICATION MODEL
      4.6.2. PREDICTION OF CLASSIFICATION MODEL
   4.7. SAMPLING BASED ON UNCERTAINTY INFORMATION OF PARAMETERS LINKED TO CLASS LABEL(S)
5. EXAMPLE PROCESSES
6. HARDWARE IMPLEMENTATION
7. EXTENSIONS AND ALTERNATIVES

1. General Overview

A system and related methods for generating class-specific data are disclosed. The data belong to an input space with an unknown initial probability distribution and a known classification scheme. From a relatively small, unbalanced dataset of samples with respect to the classification scheme in the input space, the system is programmed to learn a series of invertible transformations from the input space to a target space, a target probability distribution for the samples in the target space, and a trainable parameter probability distribution for each parameter of the target probability distribution to represent uncertainty information related to the target probability distribution. The system is programmed to further identify how to sample from each parameter probability distribution, which determine how to sample from the target probability distribution, to generate samples in the input space that are more likely to belong to specific classes. Such identification enables the class-specific generation of data for augmenting an unbalanced dataset with respect to such specific classes and for properly training a machine learning model.

In some embodiments, a data generation computer server ("server") is programmed to receive raw data, such as images of specific organs of the human body. It could be helpful to accurately represent that organ of the human body using a machine learning model, such as a three-dimensional (3D) computer-aided design (CAD) model for further analysis. It could also be helpful to accurately classify the condition of that organ of a human body based on any such image. For example, the condition may be normal, disease onset, diseased, and so on based on a classification scheme. In practice, the raw data can be scarce and imbalanced with respect to a given classification scheme. For example, even for the same organ of the human body, for certain classes, such as those representing anomalous conditions, the images of different individuals could look very different, and the number of such images could be small in the first place.

In some embodiments, the server is programmed to build a generative model to create more data or samples that are highly likely to belong to certain classes of the given classification scheme. The raw data exist in an initial space ("input space") often with an unknown probability distribution ("initial probability distribution"), where different human organs of the initial probability distribution could be associated with different classes. The server is thus programmed to build a generative model that can approximate the initial probability distribution and specifically identify portions of the initial probability distribution specific to certain organs that are more likely to be associated with the certain classes. The server can be programmed to then sample from those portions to effectively create more samples for the certain classes.

In some embodiments, the server is programmed to build a normalizing, flow-based, probabilistic generative model ("PG model"). The normalizing, flow-based, generative structure provides a series of invertible transformations from the input space to a latent space ("target space") with a probability distribution ("target probability distribution") of a known type, such as a sinh-arcsinh normal distribution. The probabilistic structure provides a predictive inference of the probability distribution ("parameter probability distribution") of each parameter of the target probability distribution. Each parameter probability distribution can be assumed to be normally distributed, for example. The probabilistic structure could be provided by a Bayesian neural network, for example. Since the target probability distribution can be transformed and mapped to the initial probability distribution, an approximated version of the initial probability distribution can be obtained from which to draw new samples in the input space. Since uncertainty information associated with the target probability distribution and thus the initial probability distribution can be obtained through the predictive inference, new samples with less uncertainty can be obtained. The server can be programmed to train the PG model using a dataset that includes the raw data and additional samples. For example, when the samples are medical images, the additional samples can be obtained using conventional image processing techniques that maintain the class labels.

In some embodiments, the server is programmed to further build a classification model to further characterize and utilize the uncertainty information. Rather than directly using the probability density values of the parameter probability distributions as indicators of uncertainty, the server is configured to tie the parameter probability distributions with the classification scheme so as to connect parameter uncertainty information to the probabilities that given samples in the input space would belong to a certain class. The server can be programmed to train the classification model using a dataset of samples with given class labels obtained using the PG model.

In some embodiments, the server is programmed to then identify which portions of the parameter probability distributions correspond to samples in the input space that are more likely to belong to certain classes. The server can be configured to designate certain zones or intervals of each parameter probability distribution, such as consecutive intervals of a specific length between a global minimum value and global maximum value of the parameter value. The server can be configured to then determine which combination of intervals respectively corresponding to all parameters of the target probability distribution would lead to samples in the input space that belong to the certain classes with higher probabilities. Specifically, the server can be configured to sample from each of the combination of intervals, which determines an instance of the target probability distribution, sample from that instance to obtain data in the target space, transform the obtained data to the input space, and run the transformed data through the trained classification model to determine the class-specific probabilities.

In some embodiments, the server is programmed to sample from those portions of the parameter probability distributions that correspond to samples in the input space that are more likely to belong to the certain classes. The server can be configured to use the newly generated class-specific data to build a new machine learning model, such as a 3D CAD model for any organ of the human body.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a data generation computer server (or the server) 102, a data processing system 104, a raw data source 106, and a user device 110, which are communicatively coupled through direct physical connections or via one or more networks 118.

In some embodiments, the server 102 broadly represents one or more computers hosting virtual computing instances, and/or instances of an application that is programmed or configured with data structures and/or database records that are arranged to host or execute functions related to generating a balanced dataset for a technical domain, such as medical applications. The server 102 can comprise a server farm, a cloud computing platform, a parallel computer, or any other computing facility with sufficient computing power in data processing, data storage, and network communication for the above-described functions.

In some embodiments, the data processing system 104 can utilize the balanced dataset, such as training a simulation system of the human body. The data processing system 104 can have a similar composition as the server 102. In certain embodiments, the data processing system 104 is integrated into the server 102.

In some embodiments, the user device 110 can represent a user of the server 102 or the data processing system 104. This user device 110 can send configuration settings to or receive output data from the server 102 or the data processing system 104. The user device 110 can comprise a desktop computer, laptop computer, tablet computer, smartphone, or wearable device.

In some embodiments, the raw data source 106 can provide raw data for a technical domain, such as raw medical images of the human body. The raw data source 106 can have a similar composition as the server 102 or the user device 110. In certain embodiments, the raw data source 106 is integrated into the server 102.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive raw data for a technical domain from the raw data source 106 and configuration settings from the user device 110. The technical domain may be associated with a classification scheme for organizing the raw data. The raw data is often scarce and imbalanced with respect to the classification scheme. The server 102 is programmed to then generate new class-specific datasets from the raw data using the configuration settings. The server 102 is configured to then send the generated dataset to the data processing system 104 for further processing, which can be based on further configuration settings from the user device 110.

3. Example Computer Components

Figure 2:
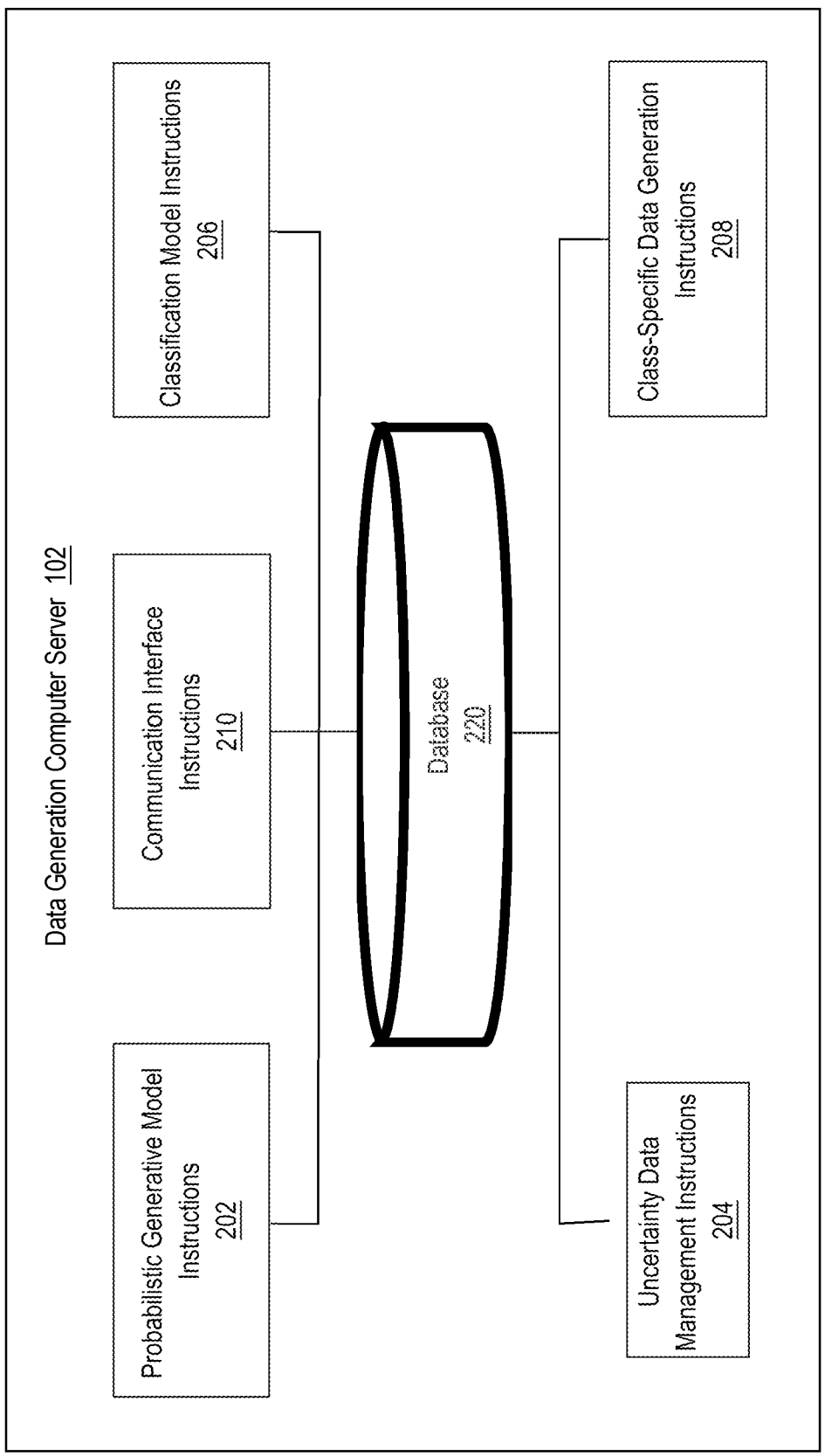
FIG. 2 illustrates example components of a data generation computer server in accordance with the disclosed embodiments.

FIG. 2 illustrates example components of a data generation computer server in accordance with the disclosed embodiments. The figure is for illustration purposes only and the server 102 can comprise fewer or more functional or storage components. Each of the functional components can be implemented as software components, general or specific-purpose hardware components, firmware components, or any combination thereof. Each of the functional components can also be coupled with one or more storage components. A storage component can be implemented using any of relational databases, object databases, flat file systems, or Javascript Object Notation (JSON) stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 comprises probabilistic generative model instructions 202, classification model instructions 206, uncertainty data management instructions 204, class-specific data generation instructions 208, and communication interface instructions 210. The server 102 also comprises a database 220.

In some embodiments, the probabilistic generative model instructions 202 enable building of a PG model. The PG model can accept an initial dataset from an input space as input and produce a target probability distribution for the target space, together with a parameter probability distribution for each parameter of the target probability distribution. The PG model can include a normalizing flow-based model having a series of invertible transformations and one or more predictive probabilistic models, such as PNNs. The PG model allows sampling from the target probability distribution by applying the invertible transformations in the reverse direction to obtain new samples in the input space. Building the PG model can comprise training the PNNs to determine parameters of the invertible transformations and validating the PG model.

In some embodiments, the classification model instructions 206 enable building a classification model. The classification model can accept samples generated from PG model as input and produce an estimated distribution of probabilities that each sample respectively falls into the available classes of a classification scheme for the input space. The classification model can be any machine learning model for classification to someone skilled in the art, such a convolutional neural network, involutional neural network, graph neural network, or random forest. Building the classification model can comprise training and validating the classification model.

In some embodiments, the uncertainty data management instructions 204, enable managing uncertainty information related to the target probability distribution for effective sampling from the target probability distribution. The managing can comprise identifying different intervals of each parameter probability distribution, sampling from these different intervals, and determining which intervals lead to samples in the input space that are more likely to fall into specific classes. The identification of such intervals can be stored in a map.

In some embodiments, the class-specific data generation instructions 208 enable generating samples in the input space for one or more classes. The generating can comprise identifying those intervals of the parameters of the target probability distribution that lead to samples in the input space that are more likely to fall into specific classes, sampling from those intervals, and transforming those samples back into the input space. The generating can also comprise utilizing the transformed samples to train another machine learning model, such as one representing one of the specific classes.

In some embodiments, the communication interface instructions 210 enable receiving and transmitting data through physical means or across computer networks by the server 102. The data received can include raw data, configuration settings for the PG model or the classification model. The data sent can include developed machine learning models, generated samples in the input space, or the generated map that specifies how to best sample from the target probability distribution by adjusting values of the parameters of the target probability distribution.

In some embodiments, the database 220 is programmed or configured to manage storage of and access to relevant data, such as raw data, configuration settings for the PG model or the classification model, developed PG model or classification model, generated samples in the input space or the target space using the raw data and the trained PG model or classification model, the generated map that specifies how to best sample from the target probability distribution by adjusting values of the parameters of the target probability distribution, or a generated machine learning model based on the generated samples in the input space.

Figure 3:
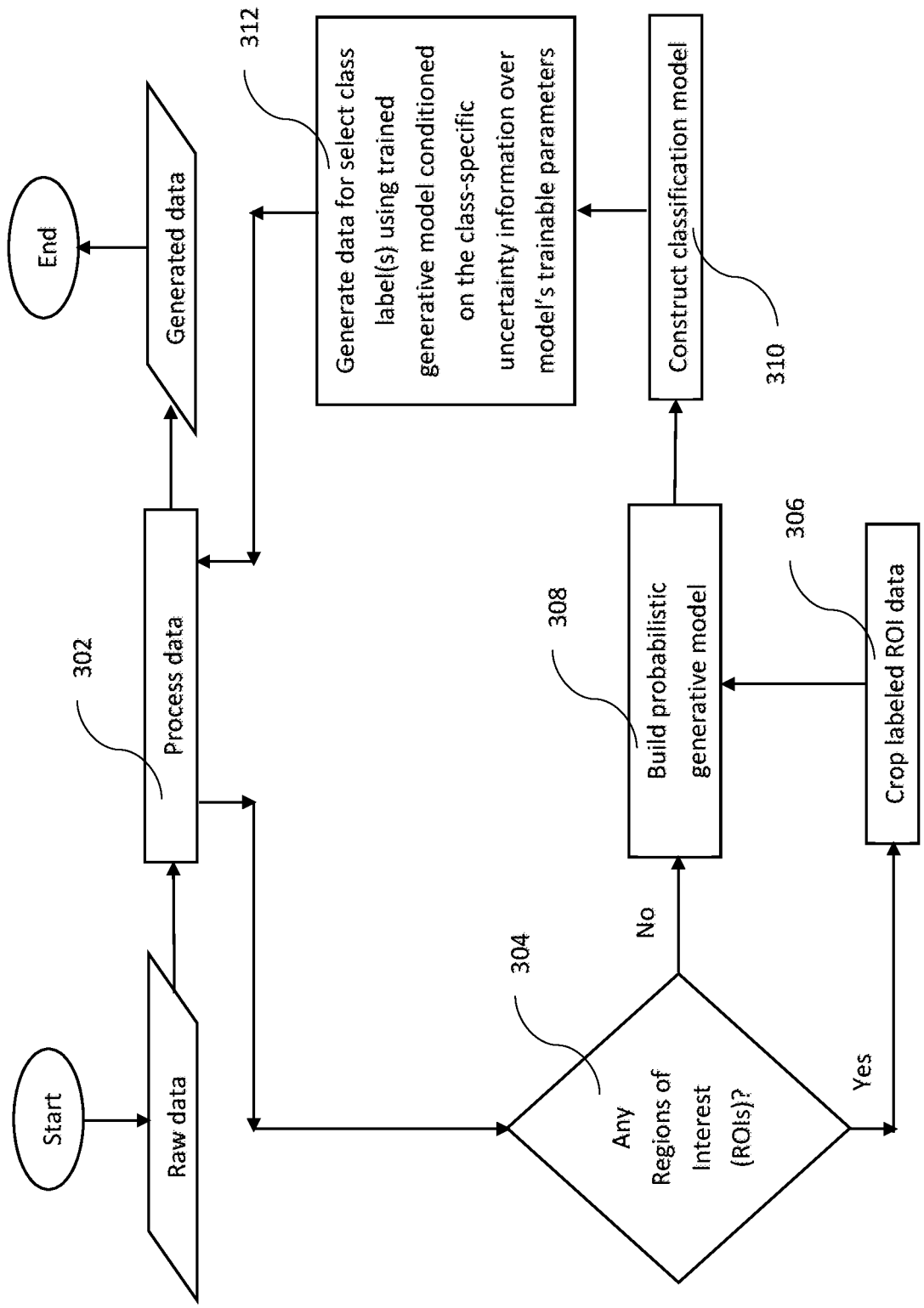
FIG. 3 illustrates an example process of generating image data starting with a small amount of raw data.

4. Functional Descriptions 4.1. Complete Workflow of Image Processing and Generation FIG. 3 illustrates an example process of generating image data starting with a small amount of raw data.

In some embodiments, the server 102 is programmed to collect raw data, which can comprise a relatively small number of sample images possibly with associated class labels. The class labels identify different classes, such as normal, anomalous, early-stage, or diseased for medical images. The raw data can include images of varying types, such as natural images or medical images. Each image can include image components, such as the pixel depth (number of bits used to encode the information of each pixel), the pixel data (numerical values of the pixels stored as integers or floating-point numbers using a certain number of bytes for representing the values), or the photometric interpretation (monochrome (grayscale) or color based on samples per pixel indicating number of channels). Natural images typically have two-dimensional (2D) pixels that are obtained using the cameras. Medical images can have 2D pixels, 3D pixels, namely voxels, or higher-dimensional pixels, namely hypervoxels, that are obtained using different imaging modalities, such as computed tomography (CT), magnetic resonance (MR) or positron emission tomography (PET). Images can include metadata, typically stored at the beginning of the raw data file as a header and containing information that describes the image in terms of the image dimensions, the spatial resolution, the pixel depth, or and the photometric interpretation. Due to a general requirement of metadata in medical images, the raw data is stored in specific file formats, such as Digital Imaging and Communications in Medicine (DICOM), Neuroimaging Informatics Technology Initiative (NIFTI), or Nearly Raw Raster Data (NRRD).

In some embodiments, the server 102 can be programmed to process the raw data in step 302, prior to feeding the raw data into the machine learning (ML) model(s) to be applied in step 308. While such processing may be domain specific, it typically involves a wide range of operations, including but not limited to denoising, smoothing, resampling and class labeling (if no class labels are included in the raw data), using techniques known to someone skilled in the art.

The purpose of the denoising is to remove the components of the transformed signal that are relatively smaller in amplitude, regardless of the signal frequency. For example, medical images, unlike natural images, contain noise due to its acquisition process using the x-rays. Such a process may induce Poisson or shot noise that is a factor of the number of photons per pixel. As a result, the pixel intensities are correlated with this noise, unlike the white gaussian noise. One of the ways to reduce the Poisson noise is to increase the exposure times of the x-rays or photons, but this longer exposure is harmful for the human tissues. Alternatively, to filter this noise, a unit variance for the Poisson distribution parameter can be adopted.

The purpose of the smoothing is to remove the components of the transformed signal that are relatively higher in frequency, regardless of the signal amplitude. It is however important to preserve the high frequency components formed by regional boundaries (edges) in the smoothing process, as they contain some vital information regarding the underlying data. For example, a filtering by an isotropic diffusion reduces the noise but also smooths the edges. Therefore, gradient-based anisotropic diffusion can be used, in which diffusion is less when gradient is larger as in the case of the edges, and vice versa.

The purpose of the resampling is to have the same resolution across all planes because, for example, medical images do not have the same pixel spacing or resolution in the axial vs. sagittal or coronal planes. A linear interpolation technique is typically used to resample the image data resulting into an isotropic resolution along the three planes.

In some embodiments, rather than feeding the whole image data to the ML models, the input data to the ML models can be restricted to specific portion(s) of the image, when applicable, termed as regions of interest (ROIs). Therefore, the server 102 can be programmed to determine whether any ROIs exist in step 304 based on the user input. For example, in CT scans, the user may be interested in a one or more organ(s) such as vertebra(e) rather than the whole spine. The user can directly select portion(s) of the image corresponding to the one or more vertebra(e) as the ROI(s). Alternatively, the server 102 can then be programmed to automatically identify the ROI(s) using image processing or classification techniques known to someone skilled in the art. Upon an affirmative determination (Yes), the server 102 can be programmed to crop and label the ROIs in step 306. Upon a negative determination (No), no cropping or labeling is performed. The resulting image, which may contain one or more ROIs, can be treated as a feature vector in further processing.

ML models perform best when the training dataset is balanced, meaning that the training dataset has an approximately equal number of samples for all the classes, and for each class, the samples follow a class-specific probability distribution. The input data in the real-world data is typically imbalanced with unequal counts or percentages of samples for one or more classes compared with other classes. One approach is to augment the input data with new samples, especially for the select classes that are lower in counts. Therefore, the server 102 is first programmed to iteratively train the ML model in step 308 to transform or fit a probability distribution of a known type ("target probability distribution") to the unknown distribution ("initial probability distribution") of the input data. The ML model include one or more probabilistic generative (PG) model(s). The training result includes probability distributions ("parameter probability distributions") for parameters of the PG models that correspond to trainable parameters of the target probability distribution, as will be further discussed in later sections. The server 102 is then configured to generate new random samples using the target probability distribution regardless of the class label(s).

In some embodiments, following the training of the PG model(s), the server 102 is programmed to train a classification model in step 310, such as a convolutional or an involutional neural network, on the random samples drawn from the target probability distribution. Specifically, samples are drawn using specific values for the four trainable parameters and assigned specific class labels to train the classification model.

In some embodiments, following the training and prediction of the classification model, the server 102 is programmed to then generate new samples of a given class in step 312 using the target probability distribution. The server 102 is programmed to rely on the parameter probability distributions and the trained classification model to increase the chance of generating appropriate samples for any given class.

For further post-processing operations, the resulting dataset is then processed in step 302. Instead of reading the raw data as in pre-processing operation, the corresponding post-processing operation involves writing the datasets to processed files, which may be of domain-specific file formats. These files can then be posted to in external servers or otherwise transmitted for downstream processing and utilization, such as augmenting a training dataset with select class(es) of samples, which is particularly helpful in case of the imbalanced input data.

4.2. Data Preparation for Probabilistic Generative Models

To prepare datasets for building the PG model in step 308, the input data or population is first divided into subgroups, subpopulations in stratified sampling, or strata, resulting into training, validation, and testing datasets, with a typical dataset ratio of 60:20:20. In an effort to make a higher percentage of the input data available for training purposes, the validation dataset is typically merged with the training dataset such that the updated dataset ratio is 80:20, for example, between training and testing datasets. To additionally improve the model's performance, a sampling (or resampling when applicable) of the data is executed, for which k-fold cross-validation is typically used. In k-fold cross-validation, the training dataset is split into k smaller sets, groups, or folds, with each fold being used as a held-out testing dataset leaving the remaining folds for the training purpose. As such, the model is trained on k−1 folds and tested on the last fold, which is different every time, resulting into k performance scores, with their average representing the model's final performance score.

Figure 4:
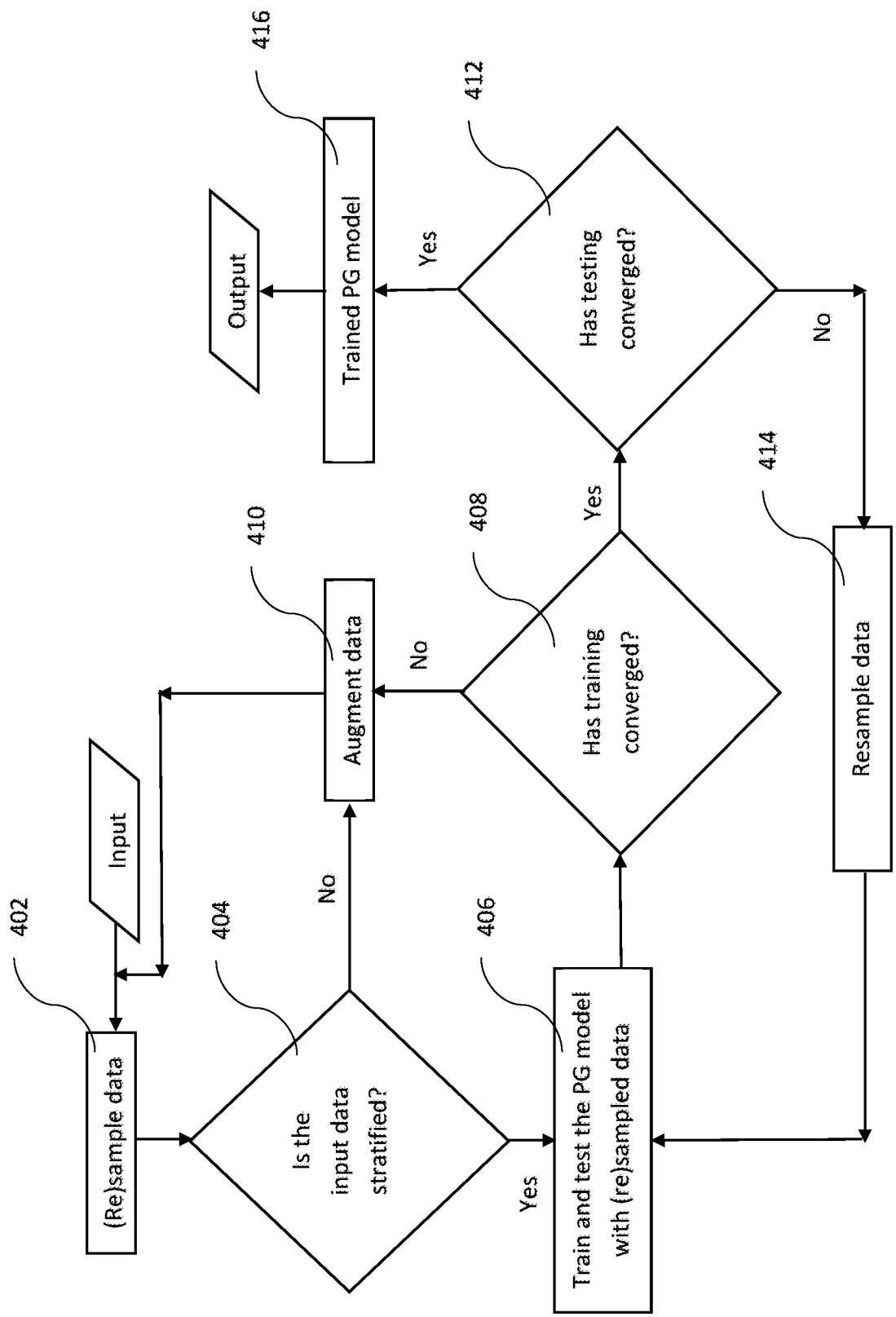
FIG. 4 illustrates an example process of building probabilistic generative models.

FIG. 4 illustrates an example process of building probabilistic generative models.

In some embodiments, to build the PG model in step 308, the stratified version of the k-fold cross-validation sampling approach is executed in step 402 N times such that N splits of the datasets are sampled as a part of the data preparation.

For each split, the training and testing datasets are then checked for stratification in step 404 using techniques known to someone skilled in the art.

Upon a negative determination (No), the server 102 can be programmed to augment the datasets in step 410 and then resample the augmented datasets in step 402, thereby increasing the number of splits. In order to augment the datasets in step 410, additional samples are typically generated from the datasets themselves using the classical spatial and intensity data transformation approaches. The spatial transformations include, affine transformations (shift, scale, or 3D rotate), flip (2D data along the third dimension), crop and/or pad, or elastic deformation. The intensity transformations include adding noise (additive gaussian, Poisson, or speckle), non-edge preserving smoothing (discrete or recursive gaussian), or edge-preserving smoothing (bilateral or median filter).

Upon an affirmative determination (Yes) in 404, both training and testing datasets are then fed further into the PG model in step 406. The rest of the steps illustrated in FIG. 4 will be discussed in later sections.

4.3. Architecture of Probabilistic Generative Models

Normalizing flows are a broad class of unsupervised ML methods for generative modeling that allows not only efficient sampling but also training via maximum likelihood using gradient descent optimization in a closed-form computation of the likelihood function. To build the PG model in step 406 in FIG. 4, the server 102 is programmed to use a technique that learns a sequence of bijective or invertible (one-to-one) and differentiable mappings or transformations, such as flow-based generative modeling. The parameters of the transformations can be learned via machine learning in a probabilistic manner, as further discussed in later sections. The discussion below focuses on flow-based generative modeling, but similar techniques can be used.

In a formulation for flow-based generative modeling, X is a random variable representing the high-dimensional data in the input space, $x \in X$, having an unknown and complex probability distribution (initial probability distribution), $x \sim P_X(x)$, specifically x denotes a training dataset, $x_{train}$, unless specified otherwise, and Z is a random variable representing data in a latent space of the same dimensions as that in the input space, $z \in Z$, having a simple probability distribution of a known type (target probability distribution), $z \sim P_Z(z)$, with a plurality of the trainable parameters. Given an invertible mapping, $f: X \rightarrow Z$, such that $z=f(x)$ and by applying the changes of variables formula, the probability density function (likelihood function, probability distribution) of x is given by, $$P_X(x) = P_Z(z)\left|\frac{\partial z}{\partial x}\right|,$$

where $|\partial z/\partial x|$ is the Jacobian determinant which is computationally tractable when the Jacobian matrix is in the triangular form.

The objective of the flow-based modeling is to learn the invertible mapping, f, which can further be built by composing a sequence of invertible mappings, $f_i$ for i=1, 2, 3 ... m, such that $f=f_1 \circ f_2 \circ f_3 \circ \ldots \circ f_m$ given by, $$x \overset{f_1}{\leftrightarrow} h_1 \overset{f_2}{\leftrightarrow} h_2 \overset{f_3}{\leftrightarrow} \ldots \overset{f_{m-1}}{\longleftrightarrow} h_{m-1} \overset{f_m}{\leftrightarrow} z,$$

where $h_1, h_2 \ldots h_{m-1}$ are the corresponding transformed data as a result of mappings, and concisely $h_0 \triangleq x$ and $h_m \triangleq z$. If H is a random variable representing data in the intermediate hidden space(s) having the same dimensions as that in the input space, $h \in H$, the path traversed by the random variables, $h_m = f_m(h_{m-1})$, with initial probability distribution, $P_X(x)$, is called the flow and the path formed by successive probability distributions, $h_m \sim P_H(h_m)$, is called the normalizing flow.

Based on above sequence of m invertible mappings, the log-likelihood of x is given by, $$\log P_X(x) = \log P_Z(z) + \sum_{i=1}^{m} \log \left|\det\left(\frac{\partial h_i}{\partial h_{i-1}}\right)\right|,$$

where log is the natural logarithmic function.

As parameters of the transformations, which correspond to parameters of the target probability distribution, are learned, samples can be generated in the input space by first drawing a sample from the target probability distribution, $z \sim P_Z(z)$, followed by its inverse, $x=f^{-1}(z)$ such that $f^{-1}: Z \rightarrow X$. Compared to other generative models, such as generative adversarial networks (GANs) and variational autoencoders (VAEs), flow-based models enable exact likelihood calculation using maximum likelihood training, which leads to no reconstruction loss and fast sampling.

A normalizing, flow-based generative model called Glow is described in Kingma D P, Dhariwal P. Glow: Generative flow with invertible 1×1 convolutions. *Advances in neural information processing systems*. 2018; 31. In Glow or other variants, the invertible mappings are learned broadly using three invertible layers—normalizing, permuting, and affine coupling—with the trainable parameters either learned from data or through neural networks. The server 102 can operate in the context of Glow but provides improved invertible layers that produce full probability distributions (parameter distributions) instead of point estimates for the parameters of transformation and thus the target probability distribution. These parameter distributions enable the estimation of uncertainty associated with the target probability distribution and thus the samples drawn from the target probability distribution and ultimately those generated in the input space.

Figure 5A:
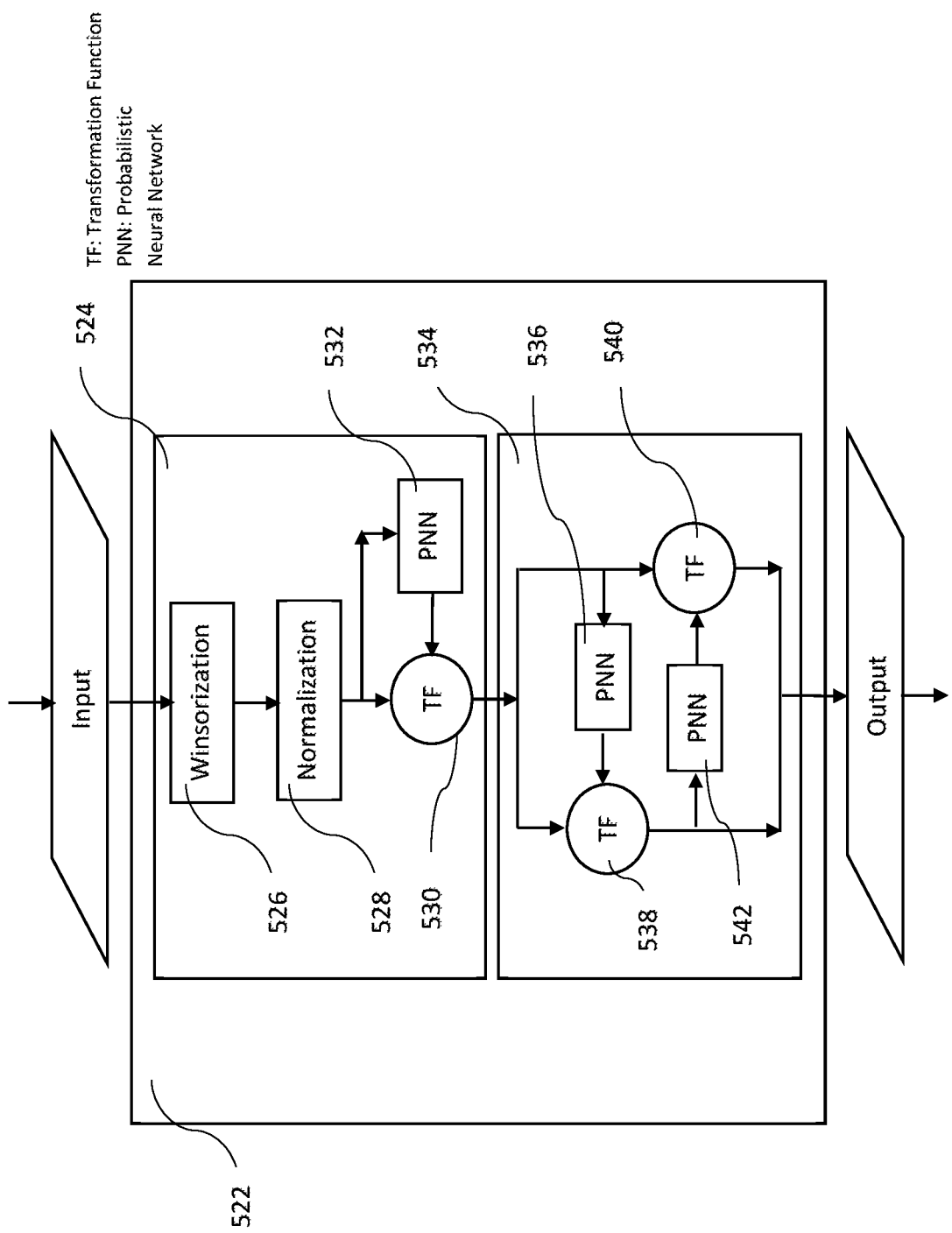
FIG. 5A illustrates an example invertible mapping in the probabilistic generative model according to the embodiments described herein.

FIG. 5A illustrates an example of invertible mapping in the probabilistic generative model according to the embodiments described herein.

In some embodiments, the PG model in step 406 comprises an invertible mapping (which could comprise multiple invertible mappings) learned through one or more repetitions of the flow block 522. The flow block 522 comprises at least two layers to be executed in sequence, the WinNorm layer 524 and the full coupling layer 534. The flow block 522 provides several improvements and benefits, as discussed below.

(1) Architecture and related computations: (a) The WinNorm layer 524 includes a winsorization step 526 prior to normalization step 528 to reduce the variance of the input data by replacing the extreme samples in the input data with more centrally located representative samples. This leads to a robust training of the PNN 532, by learning from more central, high-density regions in the input data. (b) The full coupling layer 534 allows a direct transformation of both partitions of data in a single flow block, instead of transforming only one partition at a time by an affine function while leaving the other partition intact. In other embodiments, in order to transform a higher (not full) percentage of the incoming data in the single flow block, a permutation layer to cross-mix or permute the input data followed by affine coupling can be used in combination with the WinNorm layer 524.

(2) Trainable parameters of the target probability distribution: The target probability distribution of a given type, such as the sinh-arcsinh normal distribution, can be parametrized by its moments, with the first four key moments as—mean, standard deviation, skewness, and kurtosis. The mean controls the location, the standard deviation controls the spread, the skewness controls the asymmetry, and the kurtosis controls the tailweight. Estimating the four moments of a more complex distribution than a normal distribution with only two parameters, for example, can provide a better approximation of the initial probability distribution of the input space, which can be especially helpful for medical applications or other fields that are often requiring more precision and accuracy.

(3) Posterior distributions for the parameters and data generation: In order to ascertain the confidence over the trainable parameters of the target probability distribution, a full marginalization for the trainable parameters is needed rather than their pointwise estimation. Therefore, the parameter probability distributions, namely the posterior distributions of the trainable parameters, are obtained, which leads to a better representation of the uncertainty in the underlying input probability distribution. An exploitation of such representation of the uncertainty information together with the trained classification model not only allows generating better samples of a given class, but also helps criticizing the PG model by executing posterior predictive checks. While the former can be especially helpful for medical applications or other fields that are often confronted with unbalanced sample sets, the latter further helps build a more accurate models for such applications or fields requiring higher precision.

4.3.1. Winsorization and Normalization (Winnorm) Layer

In some embodiments, prior to the winsorization step 526, the data may be passed through appropriate activation functions when necessary.

In some embodiments, for the winsorization step 526, the samples below the $\alpha^{th}$ percentile are replaced with samples in the $\alpha^{th}$ percentile and the samples beyond the $(100-\alpha)^{th}$ percentile are replaced with samples in the $(100-\alpha)^{th}$ percentile, where a is an integer between 1 and 100. This variance reduction method is termed as winsorization. In order to achieve a meaningful winsorization, the upper and lower limits governed by $\alpha$ are to be carefully selected so as not to lose information in the input data that might be important for learning in PNNs. This is generally challenging given that the initial probability distribution is unknown.

In some embodiments, the Chebyshev Inequality, which is independent of the underlying probability data distribution, is used to determine the value of $\alpha$. The Chebyshev Inequality provides insight into how spread out the data is. Specifically, if $E(X)$ is an expected value of X, k is a distance away from the expected value expressed in standard deviation units which determines the upper and lower limits governed by $\alpha$ and $M_p(X)$ is the $p^{th}$ moment of X, then the probability of X lying outside of k units from its expected value is less than the value obtained from the right-hand side of the formula below, $$P(|X - E(X)| > k) \le \frac{M_P(X)}{k^p},$$

where $M_p(X)=E(|X-E(X)|^p)$. When the probability distribution of X is known, for example, as a normal distribution, the probability of X lying outside of k units from its expected value is less than 5% if k is two times the standard deviation. When the probability distribution of X is unknown, the Chebyshev Inequality still provides the bounds for the probability of X lying outside of k units from its expected value.

In some embodiments, to further stabilize the effects from any aberrant instances in the input data, the normalization step 528 is performed such that the input data after winsorization is centered on the mean within a unit standard deviation.

Despite performing normalization using the mean and the standard deviation, the transformed data is likely still not completely normally distributed and may be asymmetric with a varying tailweight. Given that the initial probability distribution is unknown, it would be helpful to approximate the initial probability distribution by estimating all four moments or parameters of the initial probability distribution.

In some embodiments, the four parameters of the initial probability distribution are estimated by fitting the four trainable parameters of the target probability distribution to a sinh-arc sinh normal distribution parametrized by $\theta=\{\mu, \sigma, \gamma, \tau\}$ corresponding to mean, standard deviation, skewness, and kurtosis (tailweight), respectively. When $\gamma=0$ and $\tau=1$, the sinh-arc sinh normal distribution reduces to the normal distribution.

In some embodiments, the WinNorm layer includes an invertible transformation function (TF) 530 that is parameterized by the four trainable parameters of the target probability distribution, which are to be estimated using the PNN 532, as discussed in later section. The TF in step 530 is defined as, $$\mu + \sigma * S(H),$$

where * is the multiplication operator and S is the sinh-arcsinh transformation given by, $$S(H) = \sinh((\text{arc sinh}(H) + \gamma) * \tau) * \frac{2}{S\_0(2)}, \text{ and}$$

$$S\_0(H) = \sinh(\text{arc sinh}(H)) * \tau)$$

4.3.2. Probabilistic Neural Network

Figure 5B:
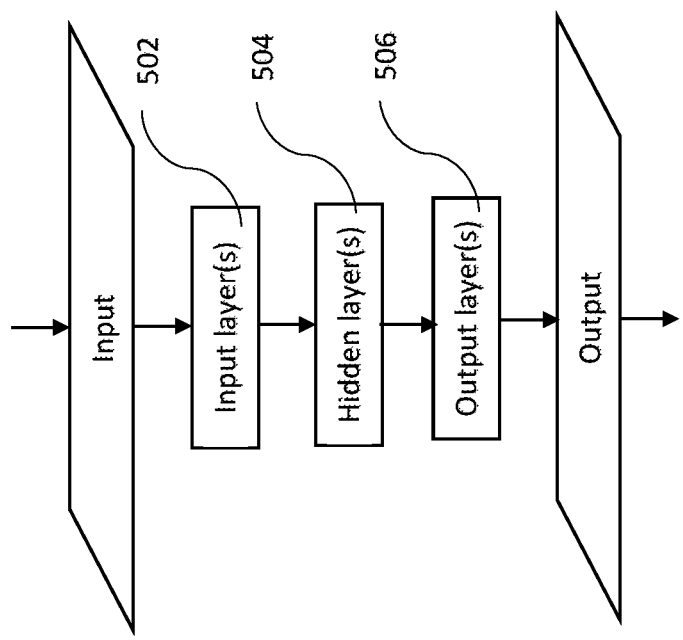
FIG. 5B illustrates an example a probabilistic neural network according to embodiments described herein.

FIG. 5B illustrates an example of a probabilistic neural network according to embodiments described herein.

In some embodiments, the PNN 532 is built with three main layers—the input layer(s) 502, the hidden layer(s) 504, and the output layer(s) 506. The input layer(s) 502 takes the output of the normalization step 528 as input and the output layer(s) 506 produces summary statistics of the trainable parameters of the target distribution as the output, which would also be the output of the PNN 532. The hidden layer(s) 504 is built with a finite series or sequence of different operations, for example, involutional, convolutional, pooling, and/or non-linear activation layers. The hidden layer(s) 504 can include dense or skip connections or other existing techniques to address the vanishing gradients. The hidden layer(s) can also include normalization or scaling the feature vectors before or after the activation layers or other existing techniques to address poor convergence.

In some embodiments, the PNN 532 estimates the posterior distribution of each of the four parameters, which can be used to assess the uncertainty associated with the target probability distribution, as further discussed in later sections. Each of the four trainable parameters (mean, standard deviation, skewness and tailweight) of the target probability distribution (a sinh-arcsinh normal distribution) is assumed to follow a (prior) normal distribution $P(\theta)$. The prior normal distributions are initialized with corresponding four means $\{0, 1, 0, 1\}$ and four standard deviations $\{1, 1, 1, 1\}$ and then to be refined through the training process to obtain their posterior distributions and hence their summary statistics in the output layer in step 506. Specifically, each of these eight parameters (four means and four standard deviations) is further modeled with a simple linear regression, $b+a\theta$, having weights—slope, a, and intercept, b.

In some embodiments, the PNN 532 implements the Bayesian method to learn the parameter probability distributions, namely the posterior distributions of the four trainable parameters of the target probability distribution conditioned on the incoming data, $P(\theta|H)$, as follows:

$$P(\theta|H) = \frac{P(H|\theta)*P(\theta)}{P(H)},$$

where $P(H|\theta)$ is the likelihood of the incoming data given the four trainable parameters, $P(\theta)$ is the prior normal distributions noted above, and $P(H)$ is the evidence or marginal likelihood. Because of the intractability of the denominator in this equation, the true posterior distribution of the parameters is approximated by mathematical techniques, for example, variational or Laplace approximations. In the former, the approximation involves finding a simpler distribution, a variational distribution, $P(\hat{\theta})$, by solving an optimization problem consisting of finding the closest possible distribution to the true posterior distribution under some measure of closeness between distributions, such as the Kullback-Leibler (KL) divergence, as noted below, such that $P(\hat{\theta}) \approx P(\theta|H)$. The true posterior distribution for the four parameters of the target probability distribution, $\theta=\{\mu, \sigma, \gamma, \tau\}$, is unknown and their corresponding variational approximations, hereinafter, are denoted by $\hat{\theta}=\{\hat{\mu}, \hat{\sigma}, \hat{\gamma}, \hat{\tau}\}$. By appropriate choice of $P(\hat{\theta})$, a lower bound is computed for log-evidence, log $P(H)$, which is maximized by minimizing the KL divergence during the training as described later.

Figure 5C:
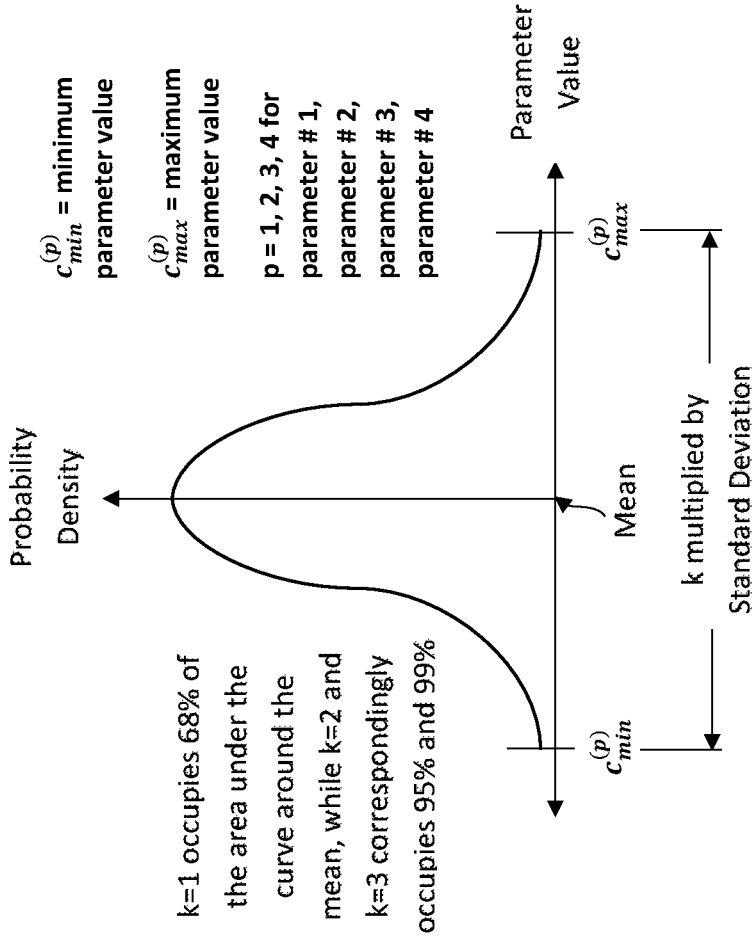
FIG. 5C illustrates a sample parameter probability distribution, or the posterior distribution of a parameter of the target probability distribution.

FIG. 5C illustrates a sample parameter probability distribution, or the posterior distribution of a parameter of the target probability distribution. In this figure, $c_{min}^{(p)}$ and $c_{max}^{(p)}$ respectively correspond to global minimum and global maximum parameter values and can be manually chosen based on a desired spread of density values to focus on. In some embodiments, summary statistics for each of the four parameter probability distributions are obtained from their posterior distributions and such summary statistics include the mean and the standard deviation, as shown in FIG. 5C. While the mean of each of the four parameter probability distributions is used to transform the data in step 530, the standard deviation of the parameters is used obtain minimum and maximum values for the four parameters, based on the desired spread of parameter density values, which define respective intervals for the four parameters. Samples drawn from such intervals are used in classification model prediction, as further discussed in later sections.

4.3.3. Full Coupling Layer

In some embodiments, the output of the WinNorm layer 524 and specifically the output of the TF 530 becomes the input of the full coupling layer 534. The full coupling layer 534 includes a TF 538 and another TF 540, each of which is again parameterized by the four parameters of the target probability distribution. The four parameters for the TF 538 are estimated by the PNN 536, and the four parameters for the TF 540 are estimated by the PNN 542. In certain embodiments, the PNNs 536 and 542 are identical to the PNN 532. These estimates produced by the PNNs 532, 536, and 542 in sequence can be considered as ever-refining estimates of the four trainable parameters of the target probability distribution.

In some embodiments, the full coupling layer 534 includes first partitioning the input into two halves ($h_{m1}$ and $h_{m2}$). The second half is passed to the PNN 536 to estimate the four parameters of the TF 538. The estimation of the four parameters of the TF 538 using the PNN 536 can be performed in the same manner as the estimation of the four parameters of the TF 530 using the PNN 532. The first half is then transformed initially by the transformation function 538 defined as, $\mu+\sigma*S(h_{m1})$.

This transformed first half is then passed to the PNN 542 to estimate the four parameters of the transformation function 540. The estimation of the four parameters of the TF 540 using the PNN 542 can be performed in the same manner as the estimation of the four parameters of the TF 530 using the PNN 532. The second half is then transformed by the TF 540 defined as, $\mu+\sigma*S(h_{m2})$.

The transformed first half and transformed second half are then concatenated.

4.4. Training and Evaluation of Probabilistic Generative Models

In some embodiments, the KL divergence is used as a measure of the discrepancy between two given probability distributions. Returning to FIG. 4, this KL divergence, $D_{KL}$, is used as the loss functions for training the PG model in step 406.

In some embodiments, the first loss function computes the KL divergence between the approximated posterior distribution of the four parameters of the target probability distribution, $P(\hat{\theta})$, and the (unknown) true posterior distribution of the parameters, $P(\theta|H)$. The first loss function is given by the following, where the unknown true posterior distribution drops out in the computation and does not need to be explicitly computed, $\mathcal{L}_{KL1} = D_{KL}(P(\hat{\theta})|P(\theta|H))$.

As discussed above, the invertible mappings of the PG model in step 406 fits the initial probability distribution, $x \sim P_X(x)$, to the transformed target probability distribution, $z \sim P_Z(z;\hat{\theta})$, parameterized hereinafter by the approximated parameters, $\hat{\theta}$, because the true posterior distribution of the parameters are unknown. In some embodiments, therefore, an approximated initial probability distribution is also then correspondingly parametrized by $\hat{\theta}$, $x \sim P_X(x;\hat{\theta})$. The second loss function computes the KL divergence between the approximated initial probability distribution parametrized by $\hat{\theta}$, $x \sim P_X(x;\hat{\theta})$, and the true initial probability distribution with unknown parameters, $x \sim P_X(x)$. The second loss function is given by the following, where similarly, the unknown initial probability distribution drops out in the computation and does not need to be explicitly computed, $$\mathcal{L}_{KL2} = D_{KL}(P_X(x;\hat{\theta}) | P_X(x)).$$

In some embodiments, a third loss function computes the negative log-likelihood (NLL) of the approximated initial probability distribution, which is also correspondingly parametrized by $\hat{\theta}$, $x \sim P_X(x;\hat{\theta})$ and is typically given by, $$\mathcal{L}_{NLL} = -\log P_X(x;\hat{\theta}).$$

In some embodiments, with a mini batch size of B drawn from the input data, the total loss function is given by, $$\mathcal{L}_{PG} = \frac{1}{B}\sum_{i=1}^{B}(\mathcal{L}_{KL1} + \mathcal{L}_{KL2} + \mathcal{L}_{NLL}).$$

Backpropagation is used to compute the gradients of the total loss function with respect to the weights of the PNNs 532, 536 and 542, including the slopes and intercepts noted above, and the mini batch gradient descent uses such gradients to update those weights, thereby minimizing the total loss function.

By minimizing the total loss function, the PG model in step 406 is trained and evaluated on N splits of the training datasets, as discussed above. Typically, around 20% of the training dataset is kept apart for a holdout validation dataset that is not used for training. This is because while the model trained on the training dataset gives an idea of how well the model is learning, the model evaluated on the validation dataset gives an idea of how well the model is generalizing.

In some embodiments, training and validation losses are first averaged across the folds and then across N splits of the datasets. The plots or curves of these average losses over the number of epochs or time steps is computed to check the model's convergence in step 408. The convergence is measured by a good fit between the two curves corresponding to training and validation losses. For example, the convergence can occur when the training and validation losses decrease to a stable point with the later loss being consistently lower than the former one with the gap between them remaining more or less the same size as the generalization gap. Upon an affirmative determination (Yes) in step 408, the trained PG model is then used for prediction in step 412 using the testing dataset. Upon a negative determination (No), further data augmentation is performed in step 410.

4.5. Posterior Prediction of Probalistic Generative Models

In some embodiments, after the PG model is trained in step 408 a posterior predictive distribution (PPD) is then computed over the approximated parameter distributions in the prediction step 412 to further ascertain whether or not the four trained parameters generate samples that follow the input data.

In some embodiments, each parameter probability distribution is divided into non-overlapping, possibly consecutive intervals between the global minimum and the global maximum parameter values. Different sets of intervals, with one interval from each parameter probability distribution for each set, can then be constructed. For example, the list of intervals for the first of the four trainable parameters (indicated by superscript 1) can be represented as $\{[c_1^{(1)}, c_2^{(1)}], [c_2^{(1)}, c_3^{(1)}] \ldots [c_{i-1}^{(1)}, c_i^{(1)}]\}$, in which $[c_1^{(1)}, c_2^{(1)}]$ denotes an interval with $c_1^{(1)}$ and $c_i^{(1)}$ being the minimum and maximum parameter values for the interval. The different sets would have different combinations of intervals. For example, the first set can include the first interval for the parameters $\{[c_1^{(1)}, c_2^{(1)}], [c_1^{(2)}, c_2^{(2)}], [c_1^{(3)}, c_2^{(3)}], [c_1^{(4)}, c_2^{(4)}]\}$ and the second set can include $\{[c_1^{(1)}, c_2^{(1)}], [c_1^{(2)}, c_2^{(2)}], [c_1^{(3)}, c_2^{(3)}], [c_2^{(4)}, c_3^{(4)}]\}$ that overlaps with first set except for the (second) interval of the fourth trainable parameter.

In some embodiments, the trained PG model in step 408 is used to make the (posterior) predictions, $\hat{x}$, over all such sets, G, when fed with the testing data, $x_{test}$, to obtain the PPD in step 412 given by, $$P_{\hat{X}}(\hat{x}|x_{test}) = \sum_{i=1}^{G} P_{\hat{X}}(\hat{x}|x_{test}, \hat{\theta}_i) * P(\hat{\theta}_i),$$

where $P_{\hat{X}}(\hat{x}|x_{test}, \hat{\theta}_i)$ is the PG model prediction given testing data, $x_{test}$, and a single set consisting of four parameter values, $\hat{\theta}_i$, each sampled from a corresponding interval as noted above and $P(\hat{\theta}_i)$ is the approximated posterior probability over the single set of four parameter values. A PPD is computed for each of the N splits of the testing datasets with each split sampled previously from stratified k-fold cross-validation approach during the data preparation, in which the last $k^{th}$ fold is different every time in each split and is used for a holdout testing dataset, $x_{test}$, that is not used for training or validation.

In some embodiments, the convergence in step 412 is measured via a posterior predictive check such that the samples generated from each PPD are compared against the samples from the input data to compute any discrepancy or divergence between them, indicating whether or not the PPD samples are within the input space. The approximated initial probability distribution refers to the probability distribution obtained from applying the series of $f_m^{-1}$ corresponding to the series of transformations discussed above to the target probability distribution. A Bayesian p-value between 0 and 1 is typically used to measure such discrepancy. If T denotes a test statistic, in this case the samples generated from the PPD, a function from a data space to the real numbers, the Bayesian p-value, $p_p$, quantifies the discrepancy measure, $T(\hat{x})$ between the null hypothesis of interest, in this case the samples generated from the PPD and the input data, $T(x)$.

$$p_p = P(T(\hat{x}) \geq T(x) | x)$$

Depending upon the domain of the application, a p-value is set, for example, 0.5, which means, if null hypothesis is true, the test statistic will be exactly equal to the median of the PPD, indicating the PG model predictions resemble the input data more. If the discrepancy obtained is much less than the set p-value as indicated by a closeness to 0 or 1, a negative determination (No) in executed in step 412, in which case the input data is resampled in step 414, as is done in step 402, followed by an iterative PG model training and testing in step 406, step 408 and step 412. Otherwise, when the discrepancy obtained is close to or from the set p-value, an affirmative determination (Yes) in executed in step 412, upon which the PG model in step 406 is said to be fully trained and is passed directly to step 416.

4.6. Mapping Uncertainty Information to Class Labels in Generated Data

When using the trained PG model in step 416 to generate images by sampling from the target probability distribution, there is no indication of which class a generated image in the input space would fall. It would be desirable for the trained PG model in step 416 to generate images in the input space that represent specific classes, especially those classes having scarce samples. In some embodiments, the server 102 is programmed to utilize the parameter probability distributions to help generate appropriate samples for specific classes, including credibly mapping the intervals of each parameter probability distribution to specific classes. For this purpose, the predictions using a trained classification model is used in step 310 of FIG. 3.

4.6.1 Training and Evaluation of Classification Model

In some embodiments, a classification model is built with input layer(s), hidden layer(s) and output layer(s). The input layer(s) is(are) fed with the training dataset generated using the trained PG model in step 416 with the four trainable parameters set to values at the respective 50$^{th}$ percentile of the respective parameter probability distributions, for example. The classification model is also fed the class labels of the samples in this training dataset, which can be in the one-hot vector format, $P^{true}$. The hidden layer(s) are built with a finite series or sequence of different operations, for example, involutional, convolutional, pooling, and/or non-linear activation layers, along with skip or dense connection layer(s) and/or with normalization layer(s), wherever applicable. The output layer(s) produce the probability, p, that a given sample belongs to each class. With a mini batch size of B drawn from the training dataset, the negative log-likelihood function for the multinomial distribution is based on the cross-entropy loss, as given by, $$\mathcal{L}_{CM} = -\frac{1}{B}\sum_{i=1}^{B} p_i^{true} * \log(p_i).$$

In some embodiments, the mini batch gradient descent uses the gradients computed by backpropagation to update the classification model weights. By minimizing above loss function, $\mathcal{L}_{CM}$, the classification model in step 310 is trained on the training dataset. The classification model can be further evaluated on around 20% of the training dataset kept apart for a holdout validation dataset that is not used for training. Similar to the training and evaluation of the PG model in step 408, the convergence is measured by a good fit between two curves representing training and validation losses. Once the classification model is trained, it is then used to predict the class label(s) on the testing dataset.

4.6.2 Prediction of Classification Model

In some embodiments, different testing datasets of intervals, with one interval from each parameter probability distribution for each set, can be constructed, as discussed in Section 4.5 above. For each testing dataset, a value can be sampled from each constituent interval of the corresponding refined parameter probability distribution, to obtain four values that defines an instance of the target probability distribution. From that instance, a certain number of samples can be generated and transformed back into the input space. The transformed samples in the input space can then each be fed into the trained classification model to predict a class probability. Over the certain number of samples, a highest probability predicted by the classification model for each class can be recorded, and this mapping from the intervals (used to obtain test dataset) to this list of highest probabilities respectively for all the classes can be saved in a map. For example, for the first sample of a particular testing dataset, the classification model may produce {class 1: 20%; class 2: 80%}, while for the second sample, the classification model may produce {class 1: 60%; class 2: 40%}. A mapping from the particular intervals to {class 1: 60%; class 2: 80%} can then be saved in the map. The input to the trained classification model can be executed over all testing datasets. In certain embodiments, instead of considering all testing datasets, the testing datasets can be randomly sampled for a given sampling ratio or according to each parameter probability distribution. For example, a testing dataset having intervals corresponding to lower probabilities can be sampled with a lower probability.

In some embodiments, all mappings are saved in the map. One or more interval sets that produce the highest probability for a class can be highlighted, or all the other interval sets can be deleted from the map. Alternatively, each mapping is saved only if the mapping information for the class does not exist previously, or a higher probability is produced for a specific class. In this way, a single class is mapped to a specific set of intervals.

4.7. Sampling Based on Uncertainty Information of Parameters Linked to Class Label(s)

In order to generate new data for a specific class in step 312 of FIG. 3, the server 102 is programmed to first obtain the credible dataset for that class, namely the dataset using respective intervals or regions for the four parameters that produce a high probability for the class, from the saved map. The server 102 is programmed to then generate samples from the target probability distribution by first sampling from the respective intervals and then transform those samples back into the input space.

In some embodiments, the server 102 can utilize the generated class-based samples for augmenting an unbalanced dataset having low counts or percentages of specific class(es) locally or send them to another data processing system. Such generated samples can be used to build another relevant machine learning model. For example, the generated samples can be used to train another classification model for the input space, or a machine learning model that specifically represents one of the classes.

5. Example Processes

FIG. 6 illustrates an example process of generating class-specific synthetic image data from raw data using uncertainty information of trainable parameters to enhance an imbalanced dataset with respect to a given classification scheme. FIG. 6 is shown in simplified, schematic format for purposes of illustrating a clear example and other embodiments may include more, fewer, or different elements connected in various manners. FIG. 6 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 602, the server 102 is programmed to obtain a first machine learning model that learns and generates a plurality of invertible mappings from an input space of feature vectors to a latent space of feature vectors and a plurality of posterior probability distributions for trainable parameters of the plurality of invertible mappings.

In some embodiments, the first machine learning model includes a layer performing winsorizing and normalization on a certain set of feature vectors to learn and generate a set of invertible mappings of the plurality of invertible mappings and a set of transformed feature vectors. In obtaining the first machine learning model, the server 102 is programmed to train a PNN to learn and generate a plurality of posterior probability distributions related to the set of invertible mappings.

In some embodiments, the server 102 is programmed to minimize a variance of the certain set of feature vectors, followed by a normalization, to obtain an intermediate set of feature vectors. The server 102 is configured to then train the PNN on the intermediate set of feature vectors to obtain the plurality of posterior probability distributions for a plurality of trainable parameters of an intermediate transform. The server 102 is configured to also sample from the plurality of posterior probability distributions to obtain a plurality of values for the plurality of trainable parameters. In addition, the server 102 is programmed to apply the intermediate transform to the intermediate set of feature vectors using the plurality of values to obtain the set of transformed feature vectors.

In some embodiments, the first machine learning model includes a layer performing a permutation on a certain set of feature vectors to learn and generate a set of invertible mappings of the plurality of invertible mappings and a set of transformed feature vectors. In obtaining the first machine learning model, the server 102 is programmed to train a PNN to learn and generate a plurality of posterior probability distributions related to the set of invertible mappings.

In some embodiments, the server 102 is programmed to train the PNN on the certain set of feature vectors to obtain a plurality of posterior probability distributions for a plurality of trainable parameters of an intermediate transform. The server 102 is configured to then sample from the plurality of posterior probability distributions to obtain a plurality of values for the plurality of trainable parameters. Also, the server 102 is configured to apply the intermediate transform to the certain set of feature vectors using the plurality of values to obtain the set of transformed feature vectors.

In some embodiments, the first machine learning model including a layer performing a full coupling on a certain set of feature vectors to learn and generate a set of invertible mappings of the plurality of invertible mappings and a set of transformed feature vectors. In obtaining the first machine learning model, the server 102 is programmed to train two PNNs to learn and generate a plurality of posterior probability distributions related to the set of invertible mappings.

In some embodiments, the server 102 is programmed to split a certain set of feature vectors into a first half and a second half. The server 102 is configured to then train a first PNN on the second half to obtain a first plurality of posterior probability distributions for a first plurality of trainable parameters of a first intermediate transform; sample from the first plurality of posterior probability distributions to obtain a first plurality of values for the first plurality of trainable parameters; and apply the first intermediate transform to the first half using the first plurality of values to obtain a transformed first half. The server 102 is programmed to then also train a second PNN on the transformed first half to obtain a second plurality of posterior probability distributions for a second plurality of trainable parameters of a second intermediate transform; sampling from the second plurality of posterior probability distributions to obtain a second plurality of values for the second plurality of trainable parameters; and applying the second intermediate transform to the second half using the second plurality of values to obtain a transformed second half. In addition, the server 102 is programmed to concatenate the transformed first half and the transformed second half to obtain a set of transformed feature vectors.

In some embodiments, the first machine learning model comprises a first layer performing winsorizing and normalization on anew set of feature vectors to learn and generate a first set of invertible mappings of the plurality of invertible mappings and a first set of transformed feature vectors, including training a first PNN to learn and generate a first plurality of posterior probability distributions related to the first set of invertible mappings. The first machine learning model also comprises a second layer performing a full coupling on the first set of transformed feature vectors to learn and generate a second set of invertible mappings of the plurality of invertible mappings and a second set of transformed feature vectors, including training a second PNN to learn and generate a second plurality of posterior probability distributions related to the second set of invertible mappings.

In some embodiments, the server 102 is programmed to receive a set of raw images of a human organ from a class of a plurality of classes of the given classification scheme. The server 102 is configured to then compute a new set of feature vectors in the input space from the set of images. In addition, the server 102 is configured to train the first machine learning model on the new set of feature vectors.

In step 604, the server 102 is programmed to determine, from the first machine learning model, a new probability distribution for feature vectors in the latent space and a plurality of posterior probability distributions for trainable parameters of the new probability distribution.

In some embodiments, the first machine learning model includes a normalizing flow-based, probabilistic generative model. The trainable parameters of the new probability distribution correspond to the trainable parameters of the plurality of invertible mappings.

In some embodiments, the new probability distribution for feature vectors in the latent space is a sinh-arcsinh normal distribution having four trainable parameters. Each posterior probability distribution of the plurality of posterior probability distributions for trainable parameters of the new probability distribution is a normal distribution.

In step 606, the server 102 is programmed to obtain a second machine learning model that classifies a feature vector in the input space into a class of a plurality of classes of the given classification scheme.

In some embodiments, the server 102 is programmed to select a value for each parameter of the trainable parameters of the new probability distribution based on the plurality of posterior probability distributions for the trainable parameters; and sample from the new probability distribution using the selected values of the trainable parameters of the new probability distribution to obtain a group of feature vectors in the latent space. The server 102 is configured to next convert the group of feature vectors in the latent space to a second group of feature vectors in the input space using the plurality of invertible mappings in a reverse direction. The server 102 is configured to then obtain a second group of labels, each label identifying a class of the plurality of classes, respectively, for the second group of feature vectors;

and train the second machine learning model using the second group of feature vectors and the second group of labels.

In step 608, the server 102 is programmed to identify, using second machine learning model, a combination of respective intervals of the plurality of posterior probability distributions that lead to a feature vector in the input space with a probability of belonging to a specific class of the plurality of classes that exceed a threshold.

In some embodiments, in identifying the combination of respective intervals of the plurality of posterior probability distributions, the server 102 is programmed to select a group of intervals respectively from the plurality of posterior probability distributions for the trainable parameters. The server 102 is configured to then sample from the group of intervals to determine an instance of the new probability distribution. The server 102 is configured to next obtain a specific feature vector in the input space based on the instance of the new probability distribution. In addition, the server 102 is configured to apply the second machine learning model on the specific feature vector to obtain a class label of a class of the plurality of classes for the specific feature vector and a classification score associated with the class label.

In some embodiments, the server 102 is programmed to select a group of intervals respectively from the plurality of posterior probability distributions for the trainable parameters; sampling from the group of intervals to determine a plurality of instances of the new probability distribution; and obtaining a certain feature vector in the input space based on each instance of the plurality of instances of the new probability distribution. The server 102 is configured to further apply the second machine learning model on the certain feature vector to obtain a certain class label of a class of the plurality of classes for the certain feature vector and a certain classification score associated with the certain class label; and recording, for each class of the plurality of classes, a highest classification score from applying the second machine learning model to the plurality of certain feature vectors corresponding to the plurality of instances of the new probability distribution, where identifying the combination of respective intervals of the plurality of posterior probability distributions is performed based on the highest classification score for a particular class of the plurality of classes.

In some embodiments, the plurality of classes corresponds to different anatomical or pathological conditions of a human organ, the particular class corresponds to an anatomical entity or a diseased condition of the human organ, the method further comprises building a computer-aided design (CAD) model for the human organ based on the specific set of input feature vectors for the specific class.

In step 610, the server 102 is programmed to sample from the new probability distribution using values of the trainable parameters of the new probability distribution sampled from the combination of respective intervals to generate a specific set of latent feature vectors in the latent space.

In step 612, the server 102 is programmed to convert the specific set of latent feature vectors to the input space using the plurality of invertible mappings in a reverse direction, thereby generating a specific set of input feature vectors as synthetic images for the specific class.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
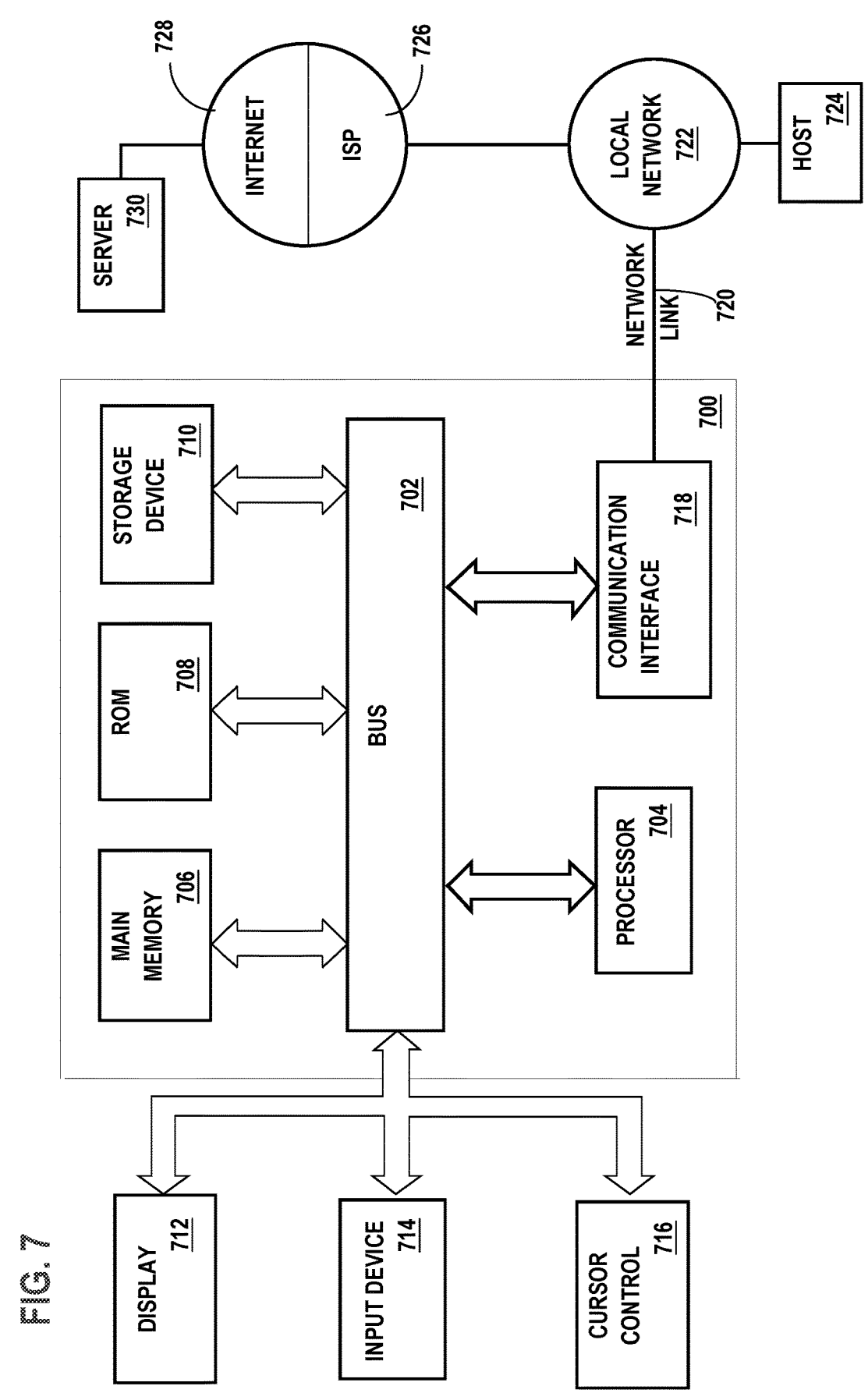
FIG. 7 is a block diagram that illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on the output device 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host computer 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to I/O subsystem 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a LAN, WAN, campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, application programming interface (API) calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed:

1. A computer-implemented method of generating class-specific synthetic image data from raw data using uncertainty information of trainable parameters to enhance an imbalanced dataset with respect to a given classification scheme, comprising:

obtaining a first machine learning model that learns and generates a plurality of invertible mappings from an input space of feature vectors to a latent space of feature vectors and a plurality of posterior probability distributions for trainable parameters of the plurality of invertible mappings, the first machine learning model including a first layer performing winsorizing and normalization on a particular set of feature vectors to learn and generate a particular set of invertible mappings of the plurality of invertible mappings and a particular set of transformed feature vectors, the obtaining the first machine learning model comprising training a Probabilistic Neural Network (PNN) to learn and generate a plurality of posterior probability distributions related to the particular set of invertible mappings;

determining, from the first machine learning model, a new probability distribution for feature vectors in the latent space and a plurality of posterior probability distributions for trainable parameters of the new probability distribution;

obtaining a second machine learning model that classifies a feature vector in the input space into a class of a plurality of classes of the given classification scheme;

identifying, using the second machine learning model, a combination of respective intervals of the plurality of posterior probability distributions that lead to a feature vector in the input space with a probability of belonging to a specific class of the plurality of classes that exceed a threshold;

sampling from the new probability distribution using values of the trainable parameters of the new probability distribution sampled from the combination of respective intervals to generate a specific set of latent feature vectors in the latent space;

converting the specific set of latent feature vectors to the input space using the plurality of invertible mappings in a reverse direction, thereby generating a specific set of input feature vectors as synthetic images for the specific class.

2. The computer-implemented method of claim 1, the first layer further performing:

minimizing a variance of the particular set of feature vectors, followed by a normalization, to obtain an intermediate set of feature vectors;

training the PNN on the intermediate set of feature vectors to obtain the plurality of posterior probability distributions for a plurality of trainable parameters of an intermediate transform;

sampling from the plurality of posterior probability distributions to obtain a plurality of values for the plurality of trainable parameters; and applying the intermediate transform to the intermediate set of feature vectors using the plurality of values to obtain the particular set of transformed feature vectors.

3. The computer-implemented method of claim 1, the first machine learning model including a second layer performing a permutation on a certain set of feature vectors to learn and generate a set of invertible mappings of the plurality of invertible mappings and a set of transformed feature vectors, the obtaining the first machine learning model comprising training a PNN to learn and generate a plurality of posterior probability distributions related to the set of invertible mappings.

4. The computer-implemented method of claim 3, the second layer further performing:

training the PNN on the certain set of feature vectors to obtain a plurality of posterior probability distributions for a plurality of trainable parameters of an intermediate transform;

sampling from the plurality of posterior probability distributions to obtain a plurality of values for the plurality of trainable parameters;

applying the intermediate transform to the certain set of feature vectors using the plurality of values to obtain the set of transformed feature vectors.

5. The computer-implemented method of claim 1, the first machine learning model including a second layer performing a full coupling on a certain set of feature vectors to learn and generate a set of invertible mappings of the plurality of invertible mappings and a set of transformed feature vectors, the obtaining the first machine learning model comprising training two PNNs to learn and generate a plurality of posterior probability distributions related to the set of invertible mappings.

6. The computer-implemented method of claim 5, the second layer further performing:

splitting the certain set of feature vectors into a first half and a second half;

training a first PNN on the second half to obtain a first plurality of posterior probability distributions for a first plurality of trainable parameters of a first intermediate transform;

sampling from the first plurality of posterior probability distributions to obtain a first plurality of values for the first plurality of trainable parameters;

applying the first intermediate transform to the first half using the first plurality of values to obtain a transformed first half;

training a second PNN on the transformed first half to obtain a second plurality of posterior probability distributions for a second plurality of trainable parameters of a second intermediate transform;

sampling from the second plurality of posterior probability distributions to obtain a second plurality of values for the second plurality of trainable parameters;

applying the second intermediate transform to the second half using the second plurality of values to obtain a transformed second half;

concatenating the transformed first half and the transformed second half to obtain the set of transformed feature vectors.

7. The computer-implemented method of claim 1, the first machine learning model comprising a second layer performing a full coupling on the particular set of transformed feature vectors to learn and generate a second set of invertible mappings of the plurality of invertible mappings and a second set of transformed feature vectors, including training a second PNN to learn and generate a second plurality of posterior probability distributions related to the second set of invertible mappings.

8. The computer-implemented method of claim 1, further comprising:

receiving a set of raw images of a human organ from a class of the plurality of classes of the given classification scheme;

computing a new set of feature vectors in the input space from the set of raw images;

training the first machine learning model on the new set of feature vectors.

9. The computer-implemented method of claim 1, the first machine learning model including a normalizing flow-based, probabilistic generative model, the trainable parameters of the new probability distribution corresponding to the trainable parameters of the plurality of invertible mappings.

10. The computer-implemented method of claim 1, the new probability distribution for feature vectors in the latent space being a sinh-arcsinh normal distribution having four trainable parameters, each posterior probability distribution of the plurality of posterior probability distributions for the trainable parameters of the new probability distribution being a normal distribution.

11. The computer-implemented method of claim 1, further comprising:

selecting a value for each parameter of the trainable parameters of the new probability distribution based on the plurality of posterior probability distributions for the trainable parameters;

sampling from the new probability distribution using the selected values of the trainable parameters of the new probability distribution to obtain a group of feature vectors in the latent space;

converting the group of feature vectors in the latent space to a second group of feature vectors in the input space using the plurality of invertible mappings in a reverse direction;

obtaining a second group of labels, each label identifying a class of the plurality of classes, respectively, for the second group of feature vectors;

training the second machine learning model using the second group of feature vectors and the second group of labels.

12. The computer-implemented method of claim 1, the identifying comprising:

selecting a group of intervals respectively from the plurality of posterior probability distributions for the trainable parameters;

sampling from the group of intervals to determine an instance of the new probability distribution;

obtaining a specific feature vector in the input space based on the instance of the new probability distribution;

applying the second machine learning model on the specific feature vector to obtain a class label of a class of the plurality of classes for the specific feature vector and a classification score associated with the class label.

13. The computer-implemented method of claim 1, further comprising:

selecting a group of intervals respectively from the plurality of posterior probability distributions for the trainable parameters;

sampling from the group of intervals to determine a plurality of instances of the new probability distribution;

obtaining a certain feature vector in the input space based on each instance of the plurality of instances of the new probability distribution;

applying the second machine learning model on the certain feature vector to obtain a certain class label of a class of the plurality of classes for the certain feature vector and a certain classification score associated with the certain class label;

recording, for each class of the plurality of classes, a highest classification score from applying the second machine learning model to the plurality of certain feature vectors corresponding to the plurality of instances of the new probability distribution, the identifying being performed based on the highest classification score for a particular class of the plurality of classes.

14. The computer-implemented method of claim 13, the plurality of classes corresponding to different anatomical or pathological conditions of a human organ, the particular class corresponding to an anatomical entity or a diseased condition of the human organ, the method further comprising building a computer-aided design (CAD) model for the human organ based on the specific set of input feature vectors for the specific class.

15. One or more non-transitory, computer-readable storage media storing instructions which when executed cause one or more processors to perform a method of generating class-specific synthetic image data from raw data using uncertainty information of trainable parameters to enhance an imbalanced dataset with respect to a given classification scheme, the method comprising:

obtaining a first machine learning model that learns and generates a plurality of invertible mappings from an input space of feature vectors to a latent space of feature vectors and a plurality of posterior probability distributions for trainable parameters of the plurality of invertible mappings, the first machine learning model including a first layer performing winsorizing and normalization on a particular set of feature vectors to learn and generate a particular set of invertible mappings of the plurality of invertible mappings and a particular set of transformed feature vectors, the obtaining the first machine learning model comprising training a Probabilistic Neural Network (PNN) to learn and generate a plurality of posterior probability distributions related to the particular set of invertible mappings;

determining, from the first machine learning model, a new probability distribution for feature vectors in the latent space and a plurality of posterior probability distributions for trainable parameters of the new probability distribution;

obtaining a second machine learning model that classifies a feature vector in the input space into a class of a plurality of classes of the given classification scheme;

identifying, using the second machine learning model, a combination of respective intervals of the plurality of posterior probability distributions that lead to a feature vector in the input space with a probability of belonging to a specific class of the plurality of classes that exceed a threshold;

sampling from the new probability distribution using values of the trainable parameters of the new probability distribution sampled from the combination of respective intervals to generate a specific set of latent feature vectors in the latent space;

converting the specific set of latent feature vectors to the input space using the plurality of invertible mappings in a reverse direction, thereby generating a specific set of input feature vectors as synthetic images for the specific class.

16. The one or more non-transitory, computer-readable storage media of claim 15, the first machine learning model including a second layer performing a full coupling on a certain set of feature vectors to learn and generate a set of invertible mappings of the plurality of invertible mappings and a set of transformed feature vectors, the obtaining the first machine learning model comprising training two PNNs to learn and generate a plurality of posterior probability distributions related to the set of invertible mappings.

17. The one or more non-transitory, computer-readable storage media of claim 16, the second layer further performing:

splitting the certain set of feature vectors into a first half and a second half;

training a first PNN on the second half to obtain a first plurality of posterior probability distributions for a first plurality of trainable parameters of a first intermediate transform;

sampling from the first plurality of posterior probability distributions to obtain a first plurality of values for the first plurality of trainable parameters;

applying the first intermediate transform to the first half using the first plurality of values to obtain a transformed first half;

training a second PNN on the transformed first half to obtain a second plurality of posterior probability distributions for a second plurality of trainable parameters of a second intermediate transform;

sampling from the second plurality of posterior probability distributions to obtain a second plurality of values for the second plurality of trainable parameters;

applying the second intermediate transform to the second half using the second plurality of values to obtain a transformed second half;

concatenating the transformed first half and the transformed second half to obtain the set of transformed feature vectors.

18. The one or more non-transitory, computer-readable storage media of claim 15, the method further comprising:

selecting a value for each parameter of the trainable parameters of the new probability distribution based on the plurality of posterior probability distributions for the trainable parameters;

sampling from the new probability distribution using the selected values of the trainable parameters of the new probability distribution to obtain a group of feature vectors in the latent space;

converting the group of feature vectors in the latent space to a second group of feature vectors in the input space using the plurality of invertible mappings in a reverse direction;

obtaining a second group of labels, each label identifying a class of the plurality of classes, respectively, for the second group of feature vectors;

training the second machine learning model using the second group of feature vectors and the second group of labels.

19. The one or more non-transitory, computer-readable storage media of claim 15, the method further comprising:

selecting a group of intervals respectively from the plurality of posterior probability distributions for the trainable parameters;

sampling from the group of intervals to determine a plurality of instances of the new probability distribution;

obtaining a certain feature vector in the input space based on each instance of the plurality of instances of the new probability distribution;

applying the second machine learning model on the certain feature vector to obtain a certain class label of a class of the plurality of classes for the certain feature vector and a certain classification score associated with the certain class label;

recording, for each class of the plurality of classes, a highest classification score from applying the second machine learning model to the plurality of certain feature vectors corresponding to the plurality of instances of the new probability distribution, the identifying being performed based on the highest classification score for a particular class of the plurality of classes.

* * * * *